US010807751B2

United States Patent
Yamamoto et al.

(10) Patent No.: US 10,807,751 B2
(45) Date of Patent: Oct. 20, 2020

(54) ANVIL AND ULTRASONIC SEALING APPARATUS

(71) Applicant: TOPPAN PRINTING CO., LTD., Tokyo (JP)

(72) Inventors: Junichi Yamamoto, Tokyo (JP); Noritaka Yuhara, Tokyo (JP); Yasuhiko Kimura, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 186 days.

(21) Appl. No.: 15/940,199

(22) Filed: Mar. 29, 2018

(65) Prior Publication Data

US 2018/0222617 A1 Aug. 9, 2018

Related U.S. Application Data

(63) Continuation of application No. PCT/JP2016/078207, filed on Sep. 26, 2016.

(30) Foreign Application Priority Data

Oct. 2, 2015 (JP) ................................. 2015-197048

(51) Int. Cl.
*B65B 51/22* (2006.01)
*B29C 65/00* (2006.01)
(Continued)

(52) U.S. Cl.
CPC ............ *B65B 51/225* (2013.01); *B29C 65/08* (2013.01); *B29C 65/7451* (2013.01);
(Continued)

(58) Field of Classification Search
None
See application file for complete search history.

(56) References Cited

U.S. PATENT DOCUMENTS

2003/0046906 A1    3/2003 Kume et al.

FOREIGN PATENT DOCUMENTS

CN    1187220 C    2/2005
JP    2001-233309 A    8/2001
(Continued)

OTHER PUBLICATIONS

Chinese Office Action issued on Chinese Application No. 2016800579933, dated Jul. 31, 2019.
(Continued)

*Primary Examiner* — Peter L Vajda
*Assistant Examiner* — Adrianna N Konves
(74) *Attorney, Agent, or Firm* — Foley & Lardner LLP

(57) ABSTRACT

An anvil of an ultrasonic sealing apparatus that includes a horn provided with a strip-shaped vibration applying surface at an end face thereof, the anvil being provided with an abutment surface at an end face thereof, the ultrasonic sealing apparatus sandwiching a laminate of two or more sheets between the vibration applying surface and the abutment surface and melting thermoplastic resin on the sheets by ultrasonic vibration delivered to the vibration applying surface, thereby bonding the laminate. The abutment surface includes a strip-shaped welding surface portion projected toward the horn, and the end face thereof is opposed to the vibration applying surface, and a plurality of block members arranged along the strip-shaped welding surface portion in an extending direction of the welding surface portion without being in contact with each other, and the plurality of block members has a height equal to or lower than the welding surface portion.

4 Claims, 5 Drawing Sheets

(51) Int. Cl.
*B29C 65/74* (2006.01)
*B65B 9/12* (2006.01)
*B65B 51/30* (2006.01)
*B29C 65/08* (2006.01)
*B65B 7/16* (2006.01)
*B29L 31/00* (2006.01)

(52) U.S. Cl.
CPC ........ *B29C 66/1122* (2013.01); *B29C 66/346* (2013.01); *B29C 66/4312* (2013.01); *B29C 66/72328* (2013.01); *B29C 66/7373* (2013.01); *B29C 66/73921* (2013.01); *B29C 66/81427* (2013.01); *B29C 66/81431* (2013.01); *B29C 66/8491* (2013.01); *B65B 7/164* (2013.01); *B65B 9/12* (2013.01); *B65B 51/30* (2013.01); *B29C 66/81419* (2013.01); *B29C 66/81425* (2013.01); *B29L 2031/7166* (2013.01)

(56) References Cited

FOREIGN PATENT DOCUMENTS

| | | | |
|---|---|---|---|
| JP | 2005-343496 A | 12/2005 | |
| JP | 4093775 B2 | 6/2008 | |

OTHER PUBLICATIONS

International Search Report with English translation and Written Opinion issued in International Application No. PCT/JP2016/078207 dated Nov. 22, 2016.

ANVIL AND ULTRASONIC SEALING APPARATUS

CROSS-REFERENCE TO RELATED PATENT APPLICATIONS

This application is a continuation application filed under 35 U.S.C. § 111(a) claiming the benefit under 35 U.S.C. §§ 120 and 365(c) of International Application No. PCT/JP2016/078207, filed on Sep. 26, 2016, which is based upon and claims the benefit of priority to Japan Priority Application No. 2015-197048, filed on Oct. 2, 2015, the disclosures of which are all hereby incorporated herein by reference in their entireties.

TECHNICAL FIELD

The present invention relates to a technique concerning an ultrasonic sealing apparatus for bonding a laminate of two or more sheets at a strip-shaped sealing position. More particularly, the present invention relates to a technique suitable for sealing paper containers that accommodate liquids or solids.

BACKGROUND ART

Paper containers for liquids are widely used for fruit beverages, liquid beverages such as tea, coffee, milk beverages, soup, and alcoholic beverages such as sake and shochu. Examples of the shape of such a container include a gable top shape, a brick shape and a cylindrical shape. For example, in manufacturing a brick-shape paper container for liquids, scores for forming the container are applied to a packaging material formed of a paper layer with thermoplastic resin layers being provided on the front and back surfaces thereof, and an edge protection tape is applied to the end portions of the packaging material. Then, the packaging material is formed into a tubular shape, and the longitudinal end portions of the packaging material are overlapped and bonded to each other, thereby forming a packaging body having a tubular shape. Subsequently, the lower end portions of the tubular packaging body are bonded to each other in the transverse direction for sealing (closing). Then, the tubular packaging body is partitioned by being sealed in the transverse direction at a position to be a spout of the packaging in the state where a tube of the tubular packaging body is filled with liquid contents. Then, the tubular packaging body is formed in a three-dimensional shape, thereby forming a paper container in a final form.

The tubular packaging body is sealed in the transverse direction by using, for example, an ultrasonic sealing apparatus described in PTL 1.

To seal the tubular packaging body, the ultrasonic sealing apparatus presses the packaging material at a sealing position of the container between an end face of a horn and an end face of an anvil, which are opposed to each other, and applies ultrasonic vibration to the horn to melt the thermoplastic resin on the surface of the packaging material with heat generated at the packaging material interface (the surface position where the overlapped sheets are in contact with each other).

Sealing the container for liquids is important to protect the contents and withstand the impact of transporting/dropping. Hence, sufficient strength is required for the sealing. Therefore, generally, sampling inspection is performed in the production of the brick-shape paper container for liquids, to check the sealing state for a sample every prescribed number of the products at the beginning of production, and during the production. The sealing state is checked by a "destructive inspection" such as a tensile test or a leak test.

From the viewpoint of enabling a sufficient sealing, the packaging material is preferably sealed in a strip-shaped manner by melting a thermoplastic resin containing a predetermined amount of resin or more between the end face (vibration applying surface) of the horn and the end face (abutment surface) of the anvil. However, when the thermoplastic resin to be melted is excessive, the melted resin intermittently and irregularly overflows along the side of the sealing position. This may form an irregularly shaped resin mass along the sealing position.

The irregularly shaped resin mass formed along the sealing position may be easily peeled off from the surface of the packaging material and may fall into the contents side.

CITATION LIST

Patent Literature

PTL 1: JP 4093775 B

SUMMARY OF THE INVENTION

Technical Problem

While attention has been focused on such a problem as set out above, the present invention has for its object the provision of an anvil and an ultrasonic sealing apparatus that is capable of preventing or reducing formation of a resin mass that can be easily peeled.

Solution to Problem

An aspect of the present invention that helps to solve the problem is an anvil of an ultrasonic sealing apparatus that includes a horn provided with a strip-shaped vibration applying surface at an end face thereof, the anvil being provided with an abutment surface at an end face thereof, the ultrasonic sealing apparatus sandwiching a laminate composed of two or more sheets between the vibration applying surface and the abutment surface, and melting thermoplastic resin on the sheets by ultrasonic vibration delivered to the vibration applying surface, thereby bonding the laminate, the anvil characterized in that the abutment surface includes a strip-shaped welding surface portion projected toward the horn, and an end face thereof is opposed to the vibration applying surface, and a plurality of block members arranged along the strip-shaped welding surface portion in an extending direction of the welding surface portion without being in contact with each other, and the plurality of block members have a height equal to or lower than the welding surface portion.

Advantageous Effects of the Invention

According to the aspect of the present invention, the thermoplastic resin between the vibration applying surface of the horn and the end face of the welding surface portion of the anvil is melted to bond the two or more laminated sheets between the vibration applying surface and the end face of the welding surface portion at the strip-shaped sealing position by welding. During the welding, the thermoplastic resin at the sealing position is heated and pressurized by being pressed and ultrasonically vibrated between the vibration applying surface of the horn and the end face of the welding surface portion of the anvil. If the amount of the thermoplastic resin is excessive, however, it is extruded to the side of the sealing position at a predetermined pressure.

To address this concern, according to the aspect of the present invention, by arranging a plurality of block members along the strip-shaped welding surface portion in parallel, the thermoplastic resin extruded from the sealing position flows into a space (hereinafter, also referred to as cavity) between the welding surface portion and the row of the block members, thereby preventing further outward movement of the thermoplastic resin due to the row of the plurality of block members. That is, the movement of the extruded thermoplastic resin is blocked by the row of the plurality of block members. In this regard, when the melted thermoplastic resin moves toward the cavity at a predetermined pressure, air in the cavity escapes outward from the gap between the block members so that depressurizing is achieved. Therefore, the present invention reduces intrusion of air to the melted thermoplastic resin that has moved to the cavity, and prevents the blocked thermoplastic resin from being formed into a defective shape.

Thus, due to the plurality of block members arranged in a row, the thickness and the width of the mass made from the extruded thermoplastic resin can be controlled. Therefore, if the thermoplastic resin is excessively melted, an irregularly shaped and easily peeled molten resin mass can be prevented from being formed.

As a result, the resin mass is prevented from entering in the contents side of the container.

BRIEF DESCRIPTION OF THE DRAWINGS

FIGS. 5A and 5B are views illustrating a tubular packaging body, in which FIG. 5A is a perspective view of the packaging body, and FIG. 5B is a cross-sectional view taken along the line I-I of FIG. 5A.

DESCRIPTION OF REPRESENTATIVE EMBODIMENTS

Next, the embodiments of the present invention will be described with reference to the drawings. It is to be understood that these embodiments are intended to be representative of the present invention. The present invention is not necessarily limited to the embodiments.

Figure 1:
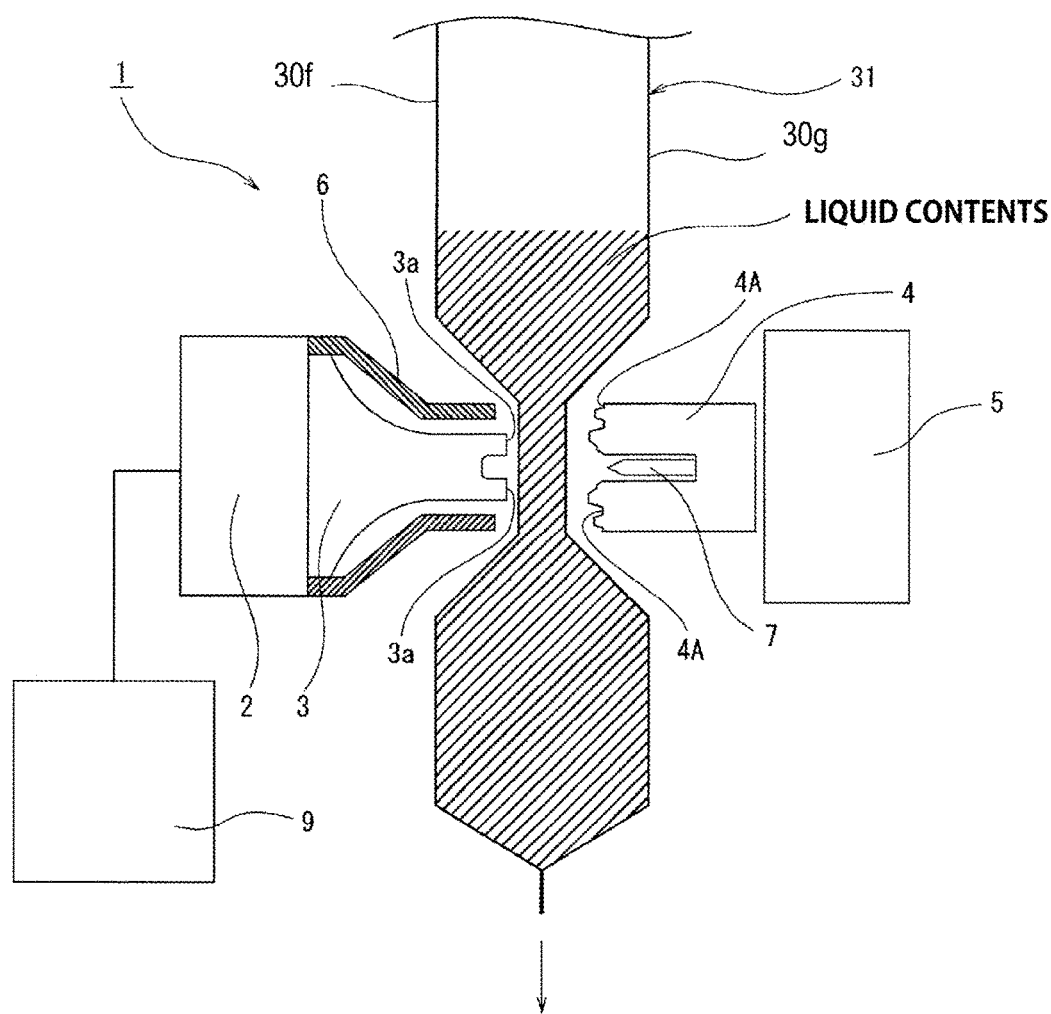
FIG. 1 is a schematic view illustrating an ultrasonic sealing apparatus of an embodiment of the present invention.

As shown in a schematic view of FIG. 1, an ultrasonic sealing apparatus 1 includes an ultrasonic oscillator 9, a converter 2 that is an ultrasonic transducer, a horn 3 and an anvil 4. Reference sign 5 indicates a jaw. Reference sign 6 indicates a horn cover for protecting the horn 3.

The converter 2 delivers ultrasonic vibration generated by an electric power supplied from the ultrasonic oscillator 9, to the horn 3. Accordingly, the end portion of the horn 3 is vibrated by ultrasonic vibration.

Figure 2:
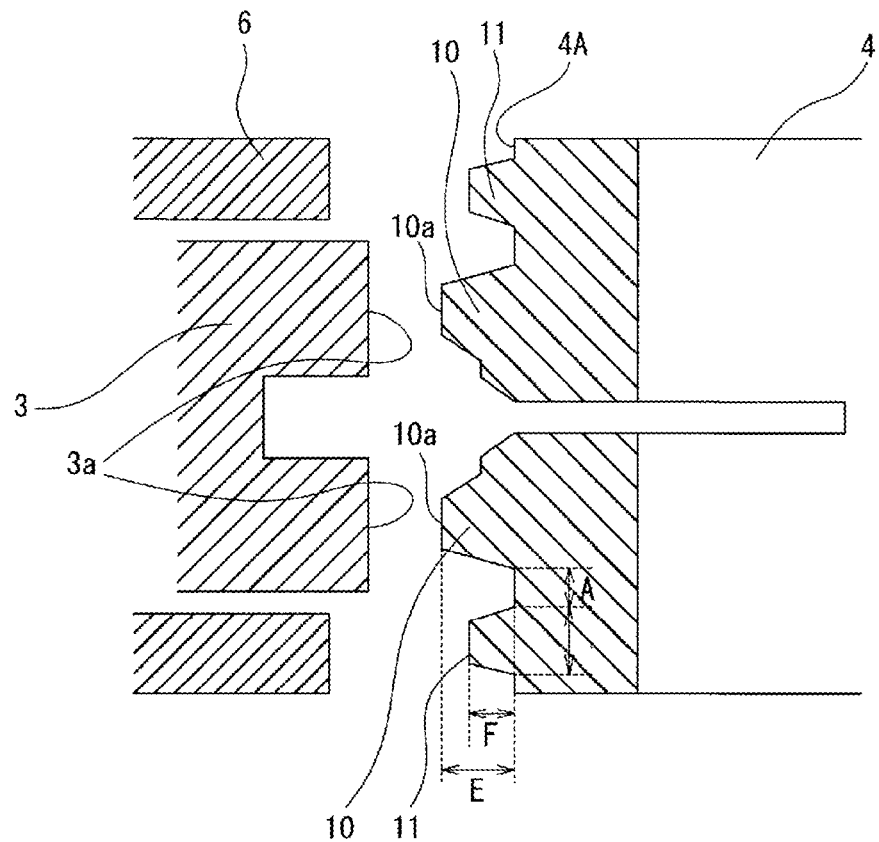
FIG. 2 is a schematic view illustrating the shape of end portions of a horn and an anvil.

In the present embodiment, two different portions are sealed at the same time. Therefore, as shown in FIG. 2, the end portion of the horn 3 is branched into two parts, and each of two parts has a vibration applying surface 3a at the end face thereof. The pair of vibration applying surfaces 3a have a strip shape (or rectangular shape), and extend parallel to each other. In FIGS. 1 and 2, the pair of vibration applying surfaces 3a extends in a direction orthogonal to paper surfaces. Further, the pair of vibration applying surfaces 3a has a groove therebetween.

The anvil 4 has an abutment surface 4A oriented to the horn 3 side at the end face thereof. The abutment surface 4A and the vibration applying surface 3a at the end face of the horn 3 can sandwich a laminate of two or more sheets in the thickness direction at a predetermined pressure. The abutment surface 4A has a pair of welding surface portions 10 projected toward the vibration applying surfaces 3a. The end faces (hereinafter, also referred to as weld pressing surfaces 10a of the welding surface portions 10 are opposed to the vibration applying surfaces 3a with the overlapped sheets therebetween.

As shown in an enlarged schematic view of FIG. 2, in the present embodiment, the width of the weld pressing surface 10a is designed to be smaller than that of the vibration applying surface 3a.

Along the strip-shaped welding surface portion 10, a plurality of block members 11 are provided. A row of the plurality of block members 11 is arranged in an extending direction of the welding surface portion 10 while adjacent block members 11 are not in contact with each other. The plurality of block members 11 may be provided at the both sides of the welding surface portions 10. However, the present embodiment shows an example in which the rows of the plurality of block members 11 are provided at the both sides, with the pair of welding surface portions 10 therebetween.

Each of the block members 11 is ensured to have a top surface (end face) at the height F lower than the welding surface portion 10, or equal to the end face of the welding surface portion 10.

FIG. 2 shows an example in which the vibration applying surface 3a is provided so as not to align with the block member 11 in a stationary state when viewed in a direction to which the block member 11 is projected (direction along which the packaging material is sandwiched between the horn 3 and the anvil 4). When the vibration applying surface 3a is provided so as to align with the block member 11 in a stationary state, the desired height F of each of the block members 11 is lower than the height E of the welding surface portion 10.

Figure 3:
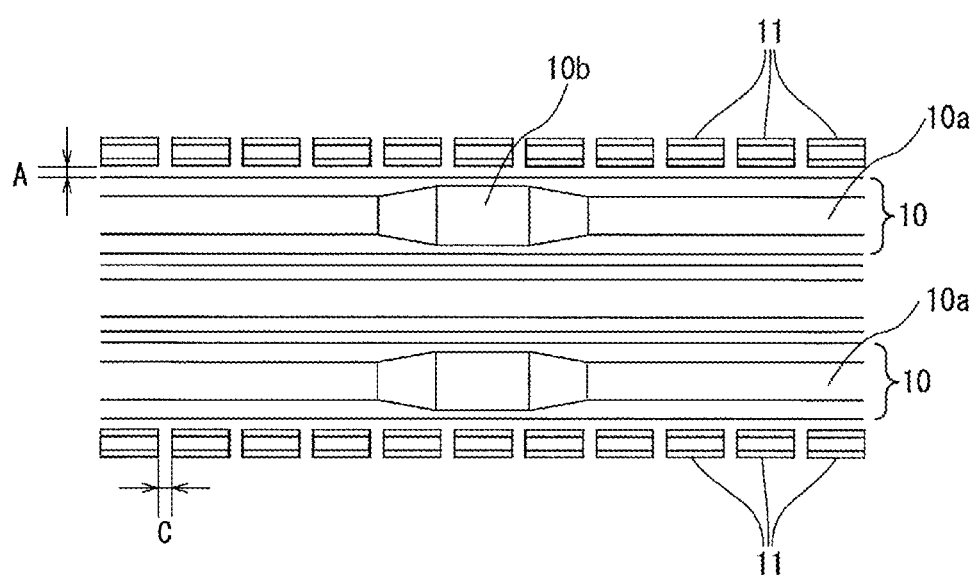
FIG. 3 is a plan view illustrating the shape of a row of block members.

As shown in FIG. 3, the plurality of block members 11 is ensured to be arranged along the extending direction of the welding surface portion 10.

Figure 4:
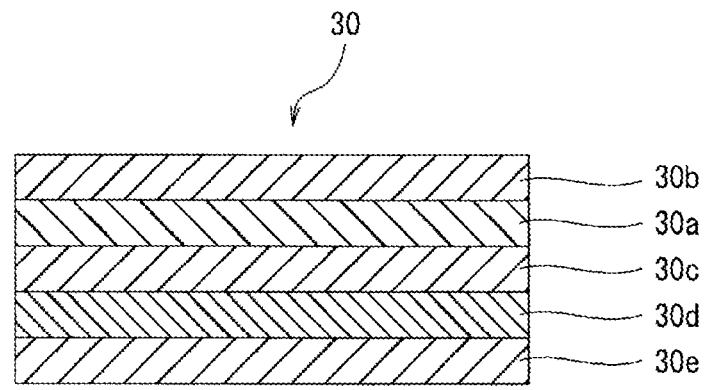
FIG. 4 is a view illustrating a layer structure of a packaging material.

For example, as shown in FIG. 4, a packaging material 30 (sheet) that forms a container is configured such that an exterior resin layer 30b is formed on the front surface side of a substrate layer 30a made of a paper. On the back surface of the substrate layer 30a, a resin film 30c, a barrier layer 30d and an interior resin layer 30e are formed in this order. Examples of the resin used for the exterior resin layer 30b, the resin film 30c and the interior resin layer 30e include a polyethylene resin. However the examples of the resin are not limited to this. However, at least the interior resin layer 30e is made of a thermoplastic resin. The barrier layer 30d is composed of a deposition film deposited on the resin film 30c, an aluminum thin film or the like, to secure barrier properties suitable for the contents to be accommodated.

In this case, the thicknesses of the exterior resin layer 30b, the substrate layer 30a, the resin film 30c, the barrier layer 30d, and the interior resin layer 30e are, for example, 15 μm, 250 μm, 15 μm, 12 μm, and 50 μm, respectively.

Figure 5A:
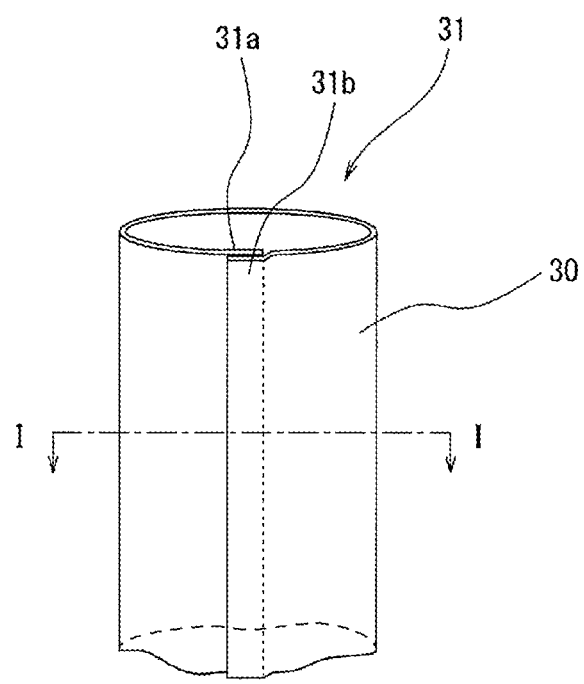
Figure 5B:
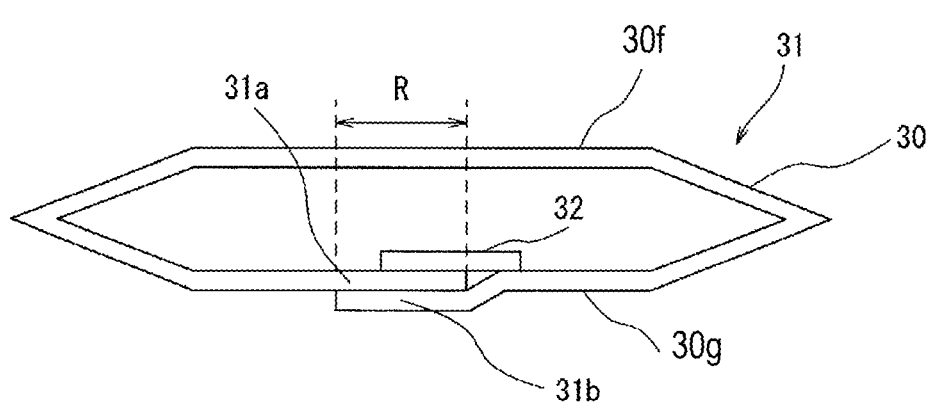

As shown in FIGS. 5A and 5B, with the interior resin layer 30e side facing inwards, this packaging material 30 is formed into a tubular packaging body 31 in which end portions thereof are overlapped with each other. This tubular packaging body 31 is formed into an elongated tubular form. In this case, a portion where an end portion 31a and an end portion 31b of the packaging material 30 are overlapped to form the tubular packaging body 31 is indicated as an overlapped portion R. The overlapped portion R extends along the axis direction of the elongate tubular packaging body 31.

As shown in FIG. 5(b), an edge protection tape 32 is adhered to the overlapped portion R. The edge protection tape 32 is adhered to the inner surface side of the tubular packaging body 31. As shown in FIG. 5(b), at least during sealing, the tubular packaging body 31 is formed into a flat-crushed shape. That is, the sheet is pressed by the horn 3 and the anvil 4 in an up-and-down direction as viewed in FIG. 5(b) to be a double-layer laminate of packaging materials 30f and 30g that compose the sheet, at the sealing position. However, at the overlapped portion R, the laminate is made of four sheets, including the edge protection tape 32.

Thus, many sheets are laminated at the overlapped portion R. Therefore, as shown in FIG. 3, the welding surface portion 10 to be in contact with the overlapped portion has a recess conforming to the laminated portion at end face thereof. FIG. 3 shows an example of the shape of a recess 10b.

Figure 6:
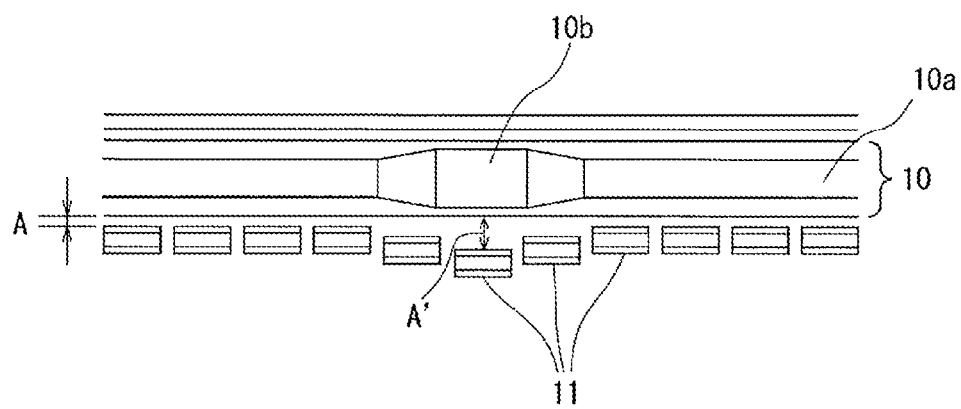
FIG. 6 is a view illustrating a modification of the shape of a row of block members.

In the above description, as shown in FIG. 3, the block member 11 has a uniform clearance from the welding surface portion 10. However, the clearance therebetween is not limited to this. For example, at the overlapped portion R, the amount of melted thermoplastic resin during sealing is relatively likely to be increased. Therefore, as shown in FIG. 6, a clearance A' from the welding surface portion 10 to the block member 11 at the overlapped portion R is preferably ensured to be larger than a clearance A, which is a clearance from the welding surface portion 10 to the block member at other position.

The adjacent block members 11 are ensured to have a gap therebetween in a range of 0.1 mm or more and 2 mm or less, for example.

This is because when the gap is less than 0.1 mm, it may be difficult to provide a space large enough to release air between the sheets, and when the gap is more than 2 mm, the melted resin may move outward.

As shown in FIG. 1, at the groove between the pair of welding surface portions 10, a cutting blade 7 is provided. The cutting blade 7 is configured to be movable towards, and away from, the horn 3 side, and is used for cutting and separating packaging body at the position between the pair of the sealing position.

(Operation and others)

FIG. 1 illustrates the brick-shape paper container for liquids being sealed at lower end portions thereof, and filled with liquid contents to be sealed at the opening (upper end portions), and, while the next container is sealed at the lower end portions thereof.

From this state shown in FIG. 1, the tubular packaging body 31 is pressed between the vibration applying surface 3a of the horn 3 and the abutment surface 4A of the anvil 4 from opposite sides at a predetermined pressure to produce a laminate. Then, ultrasonic vibration is applied to the vibration applying surface 3a of the horn 3. Accordingly, the interior resin layer 30e is melted to seal the packaging body at the pair of sealing positions in a direction orthogonal to the paper surface as viewed in FIG. 1. After sealing, the cutting blade 7 protrudes and cuts the packaging body at the position between the pair of sealing positions. In this way, the current container is sealed, and the next container located at the upper side of the current container is sealed at the lower end portions thereof.

Figure 7:
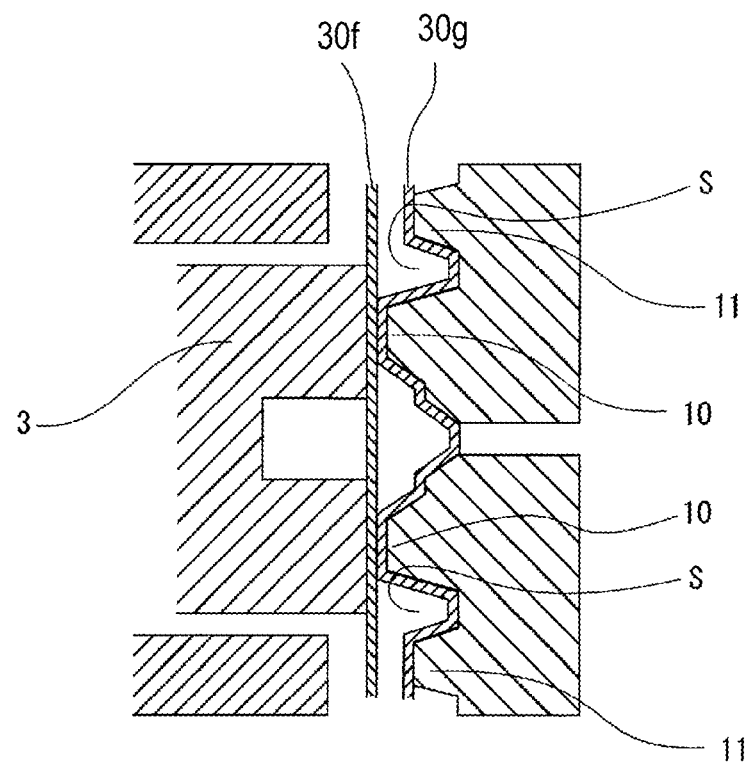
FIG. 7 is a schematic view illustrating the shape of a packaging material during sealing.

As shown in FIG. 7, when the tubular packaging body 31 is pressed between the vibration applying surface 3a of the horn 3 and the abutment surface 4A of the anvil 4 from the opposite sides, the packaging material 30g at the anvil 4 side is formed in conformity with the shape of the abutment surface 4A of the anvil 4. That is, at the sealing position between the vibration applying surface 3a and the weld pressing surface 10a (end face of the welding surface portion 10), two of the overlapped packaging materials 30f and 30g are in a contact state. However, at the side of the sealing position, a strip-shaped cavity S is formed along the sealing position. The cross-sectional shape of the cavity S is defined by the length of the clearance between the block member 11 and the welding surface portion 10, or the height of the block member 11.

In this regard, since the plurality of block members 11 have gaps therebetween, the space inside the strip-shape cavity S is not sealed. Therefore, the gap from which air is released outward at the position between the block members 11 is likely to be formed between the two packaging materials 30. In this configuration, when ultrasonic vibration is applied to the vibration applying surface 3a of the horn 3, the thermoplastic resin between the vibration applying surface 3a and the weld pressing surface 10a is melted. Accordingly, the packaging body 31 laminated at the sealing position between the vibration applying surface 3a and the weld pressing surface 10a is sealed (closed). During the sealing, when excessive amount of the thermoplastic resin is present between the vibration applying surface 3a and the weld pressing surface 10a, part of the melted thermoplastic resin is extruded sideward from the sealing position at a predetermined pressure.

This extruded thermoplastic resin flows into the strip-shaped cavity S. However, due to the row of the plurality of block members 11, further outward movement of the thermoplastic resin is prevented. That is, the movement of the extruded thermoplastic resin is blocked by the row of the plurality of block members 11.

In this regard, the melted thermoplastic resin flows toward the cavity S at a predetermined pressure. In this case, air in the cavity S escapes outward from the gap between the block members 11 so that depressurizing is achieved. Therefore, air intrusion to the melted thermoplastic resin that has moved to the cavity S is reduced. That is, breakage of the melted resin mass is prevented, which would otherwise occur by air intrusion to the melted resin mass.

The melted resin mass can be formed in conformity with the shape of the cavity S. That is, the thermoplastic resin is prevented from being formed into a defective shape.

Thus, due to the plurality of block members 11 arranged in a row, the thickness and the width of the mass made from the extruded thermoplastic resin can be controlled. Therefore, if the thermoplastic resin is excessively melted, the irregularly shaped and easily peeled molten resin mass can be prevented from being formed.

As a result, the resin mass is prevented from entering the contents side of the container.

Further, many layers, that is, three or four layers are laminated at the overlapped portion R which is a stepped portion made of laminated packaging materials 30, or at the portion to which the edge protection tape is adhered in a longitudinal direction of the tubular packaging body 31. Therefore, at these portions, the amount of melted thermoplastic resin is increased compared with other portions. However, as shown in FIG. 6, by ensuring the clearance to be relatively large, the melted resin mass is prevented from overflowing from the cavity S, and being formed into a wavelike and irregularly shaped molten resin mass. As a result, the effect of preventing intrusion of the resin mass to the contents side of the container is imparted.

Figure 8:
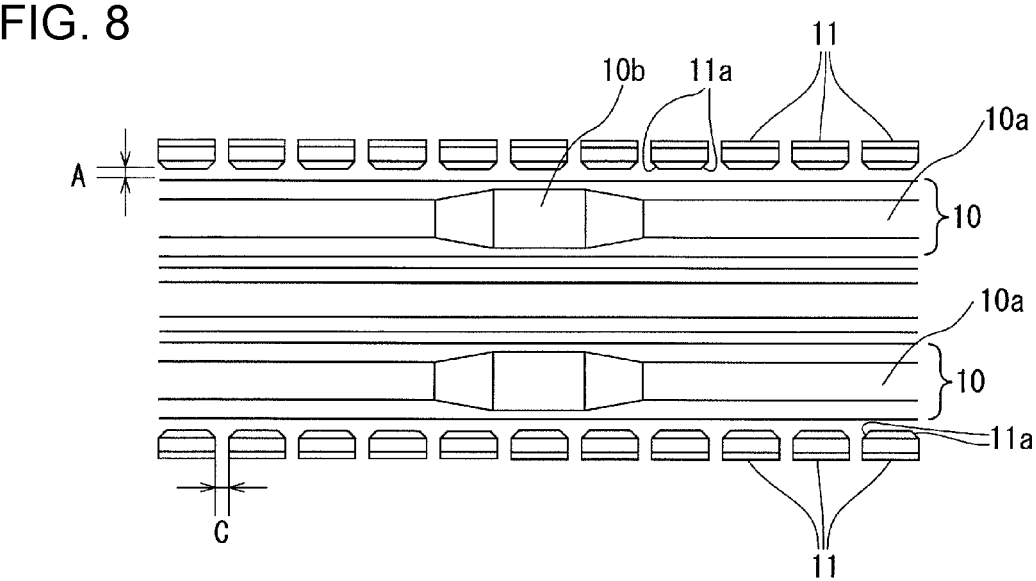
FIG. 8 is a plan view illustrating a modification of block members.

In the above embodiment, the shape of the block member 11 is a rectangular as viewed from a direction in which the block member is provided. However, the shape is not limited to this. For example, as shown in FIG. 8, the edges 11a of the block member 11 may be chamfered so that air in the cavity S is likely to escape from the gap between the block members 11.

The bottom surface of the cavity S is ensured to be located at the same level of the gap between the block members 11. Therefore, when the gap between the block members 11 is too large, part of the melted resin that has been moved to the cavity S may flow into the gap position through the gap. Accordingly, the height of the gap between the block members 11 may be raised to a height higher than the surface between the welding surface portion 10 and the row of the block members 11 (bottom surface of the cavity S). For example, the raised amount of the height of the gap between the block members 11 is set to be in a range of 10% or more and 50% or less of the height of the block member 11. For example, by forming a semicircular arc-shaped recess on the abutment surface 4A positioned between the welding surface portion 10 and the row of the block members 11, it is possible to make the surface between the welding surface portion 10 and the row of the block members 11 relatively lower than the gap between the block members 11.

The present application claims the benefit of priority to Japanese patent application No. 2015-197048 (filed Oct. 2, 2015), the entire contents of which are incorporated herein by reference.

The present embodiment is merely an example of a configuration for embodying the technical idea of the present invention, and thus the technical idea of the present invention should not be construed as specifying the materials, shapes, structures, arrangements, and the like of the components. Various modifications can be made to the technical idea of the present invention within the technical scope of the claims.

REFERENCE SIGNS LIST

1 Ultrasonic sealing apparatus; 2 Converter; 3 Horn; 3a Vibration applying surface; 4 Anvil; 4A Abutment surface; 9 Ultrasonic oscillator; 10 Welding surface portion; 10a Weld pressing surface; 10b Recess; 11 Block member; 30 Packaging material; 30f Packaging material; 30g Packaging material; 30a Substrate layer; 30b Exterior resin layer; 30c Resin film; 30d Barrier layer; 30e Interior resin layer; 31 Packaging body; A Clearance; C Gap dimension; S Cavity.

What is claimed is:

1. An anvil of an ultrasonic sealing apparatus, comprising a horn provided with a strip-shaped vibration applying surface at an end face thereof,
the anvil being provided with an abutment surface at an end face thereof,
the ultrasonic sealing apparatus sandwiching a laminate composed of two or more sheets between the vibration applying surface and the abutment surface and melting thermoplastic resin on the sheets by ultrasonic vibration delivered to the vibration applying surface, thereby bonding the laminate,
wherein the abutment surface comprises a strip-shaped welding surface portion projected toward the horn side, and an end face thereof is opposed to the vibration applying surface and a plurality of block members arranged along the strip-shaped welding surface portion in an extending direction of the welding surface portion without being in contact with each other;
wherein the plurality of block members has a height equal to or lower than the welding surface portion and wherein a gap between adjacent block members of the plurality of block members is set to be 0.1 mm or more and 2 mm or less.

2. The anvil of claim 1, wherein the anvil has a pair of strip-shaped welding surface portions, rows of the plurality of block members are respectively formed on both sides, and with the two welding surface portions therebetween.

3. The anvil of claim 1, wherein a clearance from the block member to the welding surface portion is determined depending on the number of the laminated sheets, and, at a position where the number of the laminated sheets is large, the clearance is ensured to be equal to or larger than that of a position where the number of the laminated sheets is small.

4. An ultrasonic sealing apparatus for sealing an opening of a container that accommodates liquid or solid contents therein, comprising the anvil of claim 1.

* * * * *